United States Patent [19]
Tylmann

[11] 4,370,230
[45] Jan. 25, 1983

[54] DRAINPIPE FOR A REVERSIBLE DRAINPIPE FILTER SYSTEM

[75] Inventor: Josef Tylmann, Winterthur, Switzerland

[73] Assignee: Sulzer Brothers Limited, Winterthur, Switzerland

[21] Appl. No.: 259,187

[22] Filed: Apr. 30, 1981

[30] Foreign Application Priority Data

May 12, 1980 [CH] Switzerland ............... 3695/80

[51] Int. Cl.³ ............................................. B01D 23/20
[52] U.S. Cl. ..................................... 210/289; 210/293
[58] Field of Search ............... 138/42; 210/279, 289, 210/291, 293; 239/542, 547; 405/43–45, 50

[56] References Cited

U.S. PATENT DOCUMENTS

| 2,710,692 | 6/1955 | Kegel et al. | 210/293 |
| 2,874,844 | 2/1959 | Wanner | 405/43 |
| 3,870,236 | 3/1975 | Barragan | 138/42 |
| 3,896,999 | 7/1975 | Barragan | 138/42 |
| 3,915,384 | 10/1975 | Diggs | 239/542 |
| 4,065,391 | 12/1977 | Farabaugh | 210/293 |

Primary Examiner—Ivars C. Cintins
Attorney, Agent, or Firm—Kenyon & Kenyon

[57] ABSTRACT

The drainpipe is of triangular cross-sectional shape and has an oblong slot in the bottom surface which is closed over by a stepped ledge having webs and grooves. The slot and grooves in the ledge form a flow connection between the filter basin and the interior of the drainpipe. The drainpipe is simple to manufacture and dead zones in the filter mass not wetted by the flushing media during back flushing are completely avoided or reduced to a minimum.

5 Claims, 6 Drawing Figures

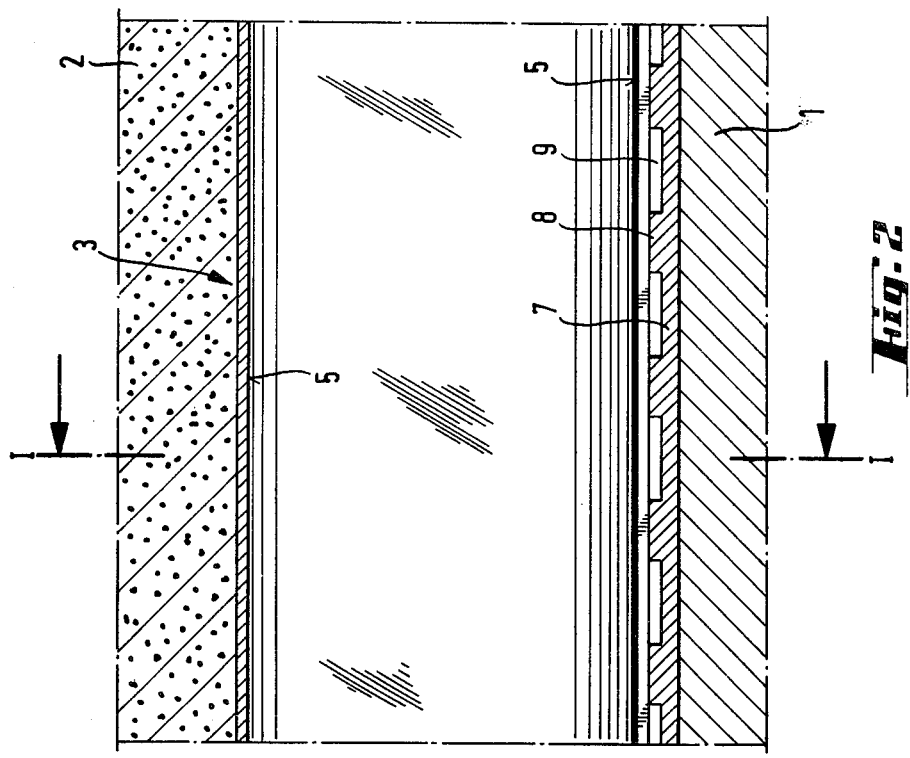
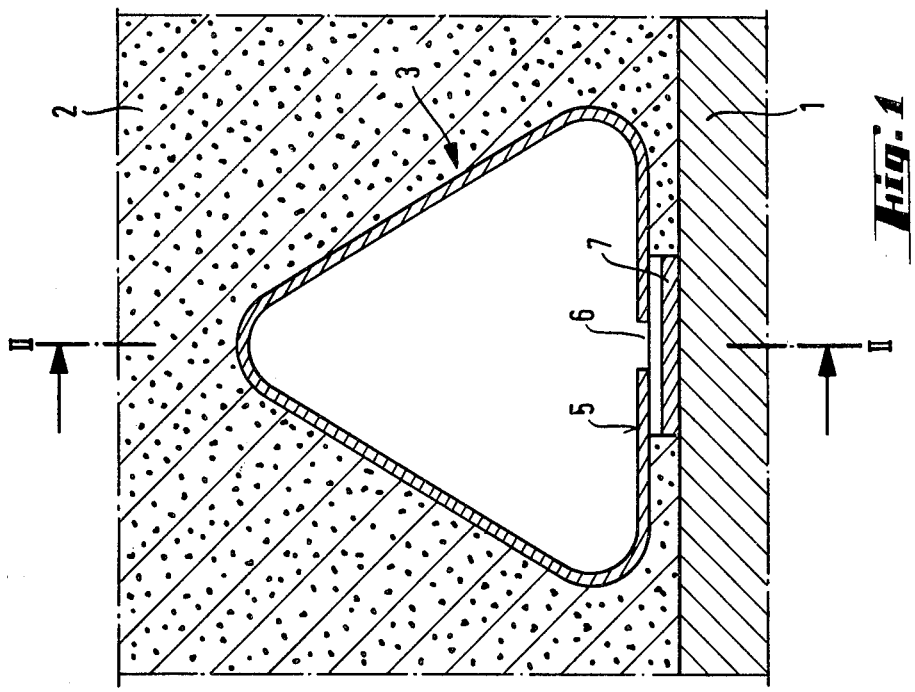

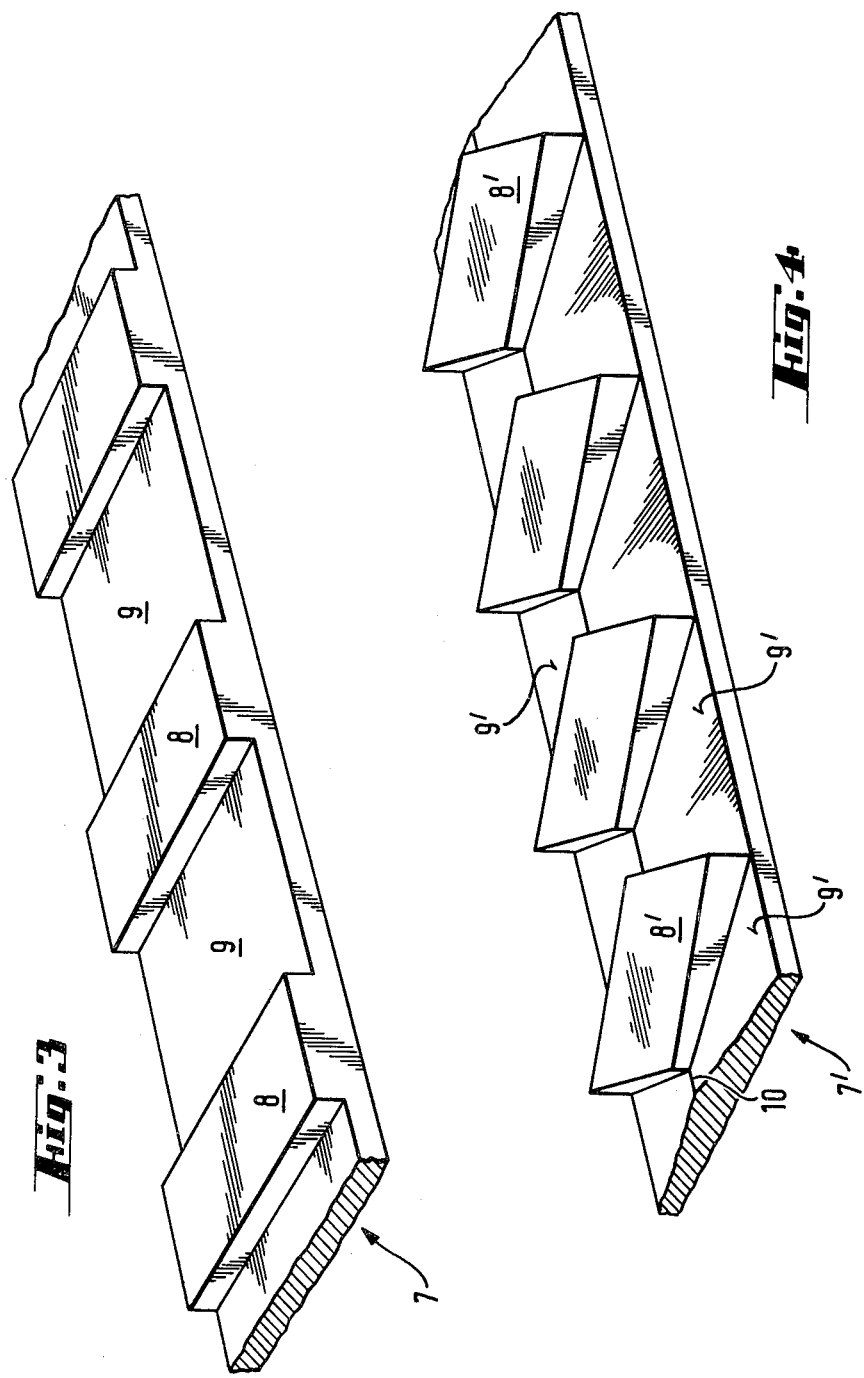

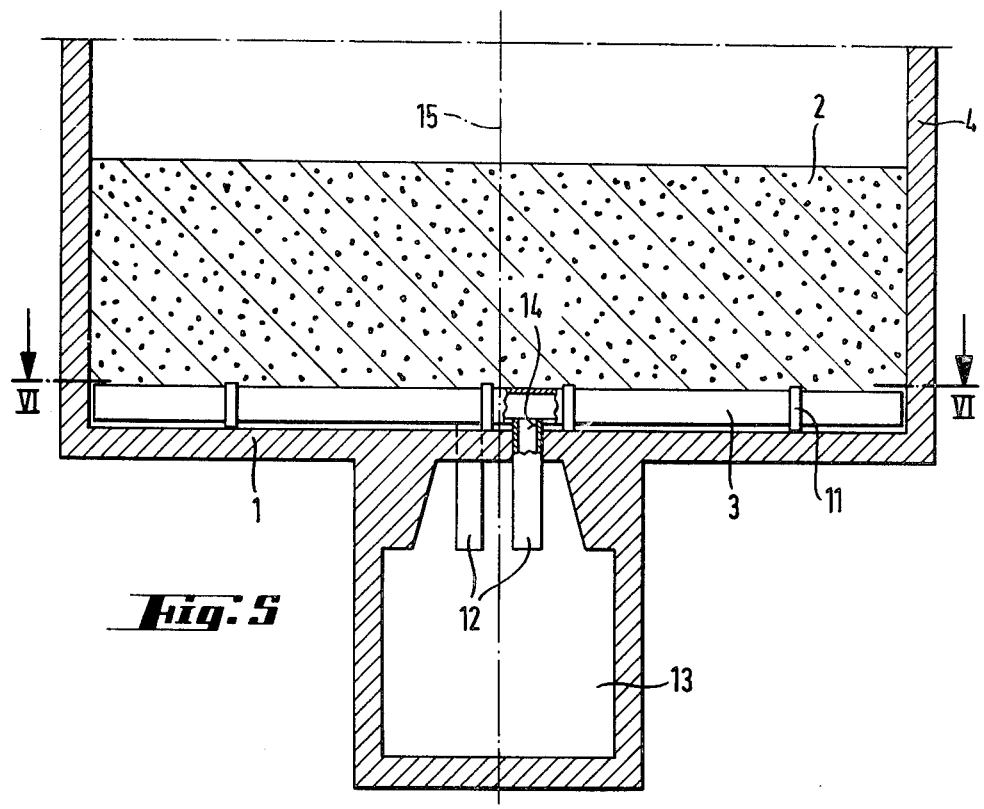
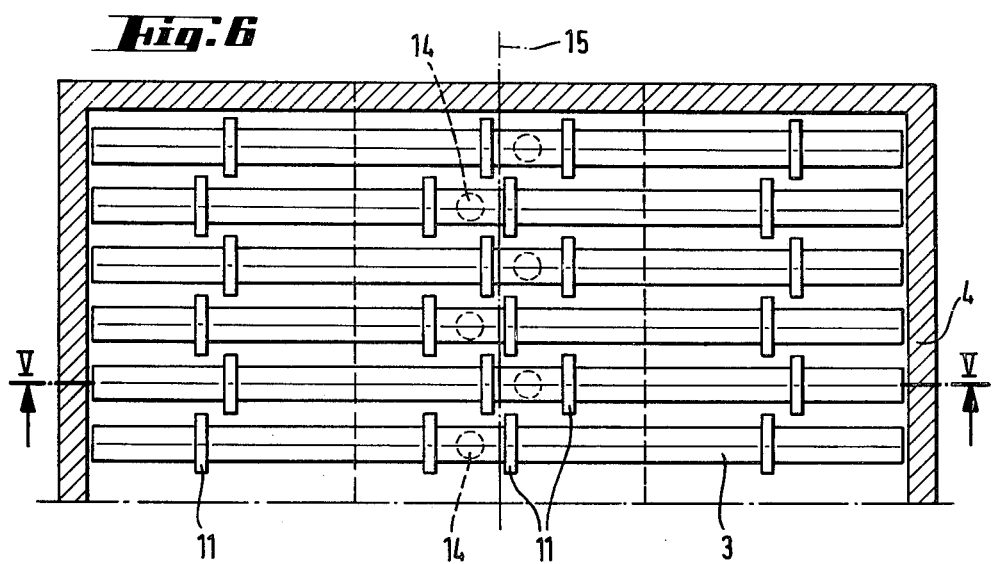

DRAINPIPE FOR A REVERSIBLE DRAINPIPE FILTER SYSTEM

This invention relates to a drainpipe for a reversible drainage filter system. More particularly, this invention relates to a drainage filter system utilizing a drainpipe of triangular cross-section.

Heretofore, various types of filter systems have been known for the filtering of liquids, particularly water. For example, it has been known to construct a system with at least one filter bed consisting of a granular filter substance which can be backwashed and a backwashing means for periodically cleaning the filter substance, for example by means of compressed air and/or pressurized water. In such cases, use has been made of drainpipes, for example as described in DAS No. 24 36 447 and DOS No. 28 52 316. The purpose of these drainpipes has been to collect the purified liquid which is conducted through the filter bed and to remove the liquid from the system as well as to supply and distribute a flushing media required for backwashing the filter bed evenly over the entire filter surface. In general, the drainpipes are arranged in a granular filter mass or in a granular supporting layer for the filter mass.

In order to prevent losses of granular filter material from the filter bed or the granular supporting layer, the openings for entry into the drainpipes and for the discharge of the flushing media must be smaller than the grain size of the filter bed or the supporting layer in which the pipes are embedded. Accordingly, it has been known to provide the drainpipes with a plurality of slots such as described in DAS No. 24 36 447. It is also known in other systems to have the drainpipes provided with bores which are covered with slotted supporting shells or filter nozzles, for example as described in DAS No. 24 14 080 and DOS No. 28 52 316. Still, in other cases, it has been known to provide drainpipes of triangular cross-section with filter nozzles, for example as described in copending application Ser. No. 179,964, filed Aug. 21, 1980. However, these known arrangements for the establishment of a flow connection between the filter mass and the drainpipes have been relatively elaborate and expensive.

As is known, because unflushed dead zones can permit bacteria to germinate, it has been important, particularly in filter systems which are used for the treatment of drinking water, for flushing back the filter mass to arrange the openings for the issuance of the flushing media in the drainpipes so that the entire filter mass and, if necessary, the supporting layer, are effectively flushed. In the previously known constructions noted above, the required penetration of the flushing media into all regions of the granular mass has not been readily obtained. Thus, dead zones may appear close to the bearing point on the filter bottom in constructions which employ slotted supporting shells as well as in drainpipes with a circular cross-section with filter nozzles. Furthermore, where circular drainpipes have laterally directed outlet openings, the upper zone cannot lie in the flow range of the flushing media.

Accordingly, it is an object of the invention to provide a drain pipe which is simple to manufacture and which can insure the passage of a backwashing media over the entire filter mass and/or a supporting layer.

It is another object of the invention to provide a drainpipe for a reversible filter system which is of relatively simple construction.

It is another object of the invention to reduce the dead zones in a filter system during backwashing.

Briefly, the invention provides a drainpipe for a reversible drainpipe filter system for water treatment which has a triangular cross-sectional shape and at least one oblong slot in a bottom facing surface as well as a stepped ledge covering the slot. In accordance with the invention, the stepped ledge includes a plurality of upstanding webs and grooves facing the slotted drainpipe surface at regular intervals.

As the drainpipe does not require individual openings which may be equipped with filter nozzles under certain circumstances but rather can be produced in a simple manner by bending a band-type strip three times, the manufacture of the drainpipe is considerably simplified. In this respect, the fastening of the stepped ledge along the slot formed by bending presents no difficulties. Further, the ledge can be joined with the slotted surface of the drainpipe, for example by spot welding or cementing.

As the drainpipe is slotted along the bottom surface, a flushing media can issue in a horizontal direction directly above a filter bottom. This has been found to be most advantageous for the distribution of the flushing media without the formation of dead zones in a granular mass in which the drainpipe may be embedded. In addition, the flow is guided along the filter bottom before being deflected into an upward direction at the end of the surface of the pipeline facing the filter bottom.

The distribution of the flushing media can be improved if the grooves of the ledge widen from a center line of a ledge towards each side and/or if each groove has a base extending downwardly of the center line of the ledge toward each side.

The drainpipe may be incorporated in a filter system which also includes a filter basin having a bottom for receiving a filter bed and a collecting main extending below the basin along a symmetrical vertical plane. In this case, a plurality of the drainpipes are mounted within the base on the bottom of the basin in perpendicular relation to the vertical plane. This collecting main can be used for the discharge of a filtrate from the drain pipes as well as for the supply of the flushing media. To this end, the individual drainpipes are provided with an opening in the bottom surface which is offset from the midpoint of the drainpipe and which is connected with an immersion tube which extends into the collecting main. The openings of the individual drainpipes are staggered from one to the other along the symmetrical vertical plane of the collecting main. This has the advantage that the formation of lightly flushed dead zones in the vicinity of the openings are avoided.

These and other objects and advantages of the invention will become more apparent from the following detailed description taken in conjunction with the accompanying drawings in which:

FIG. 1 illustrates a view taken on line I—I of FIG. 2 of a part of a filter system constructed in accordance with the invention;

FIG. 2 illustrates a view taken on line II—II;

FIG. 3 illustrates one embodiment of a ledge according to the invention having upstanding webs and alternating recesses;

FIG. 4 illustrates a modified ledge according to the invention having upstanding webs of rhombic shape and grooves of widening shape and sloping bases;

FIG. 5 illustrates a cross-sectional view of a filter system constructed in accordance with the invention taken on line V—V of FIG. 6; and FIG. 6 illustrates a view taken on line VI—VI of FIG. 5.

Referring to FIGS. 1 and 2, the drainpipe 3 has a triangular cross-sectional shape and is disposed within a filter bed 2 above a bottom 1 of a filter basin 4 (see FIG. 5). The drainpipe 3 is provided with at least one oblong or elongated slot 6 in the bottom facing surface 5 of the drainpipe 3. This slot 6 extends longitudinally of the drainpipe 3 and is centered in the surface 5.

In addition, a stepped ledge 7 covers the slot 6 of the drainpipe 3 from the outside. This ledge 7 is secured to the outside of the drainpipe surface 5, for example by cementing or welding. The ledge 7 is formed in the manner of a rack and has a plurality of upstanding webs 8 and grooves 9 facing the drainpipe surface 5 at regular intervals. As indicated in FIG. 2, the webs 8 bear against the surface 5 while the grooves 9 form a flow connection with the slot 6 for filtrate flowing into the drainpipe 3 or a flush back media flowing from within the drainpipe 3. As shown in FIG. 3, the lateral boundaries of the webs 8 and the bottoms of the grooves 9 extend transversely of the length of the ledge 7 and in parallel to the drainpipe surface 5.

Referring to FIG. 4, in order to provide for an improvement in the distribution of the flushing media and for a reduction of the lightly flushed regions in the shadow of the edges of the ledge 7, the webs 8' are made rhombic in shape so that the grooves 9' widen from a center line 10 of the ledge 7' towards each side of the ledge 7'. In addition, each groove 9' has a base extending downwardly from the center line 10 of the ledge 7' toward each side of the ledge 7'. In this manner, the zones directly behind the lateral or bottom edges of the webs 8' and grooves 9' are reduced relative to the webs 8 and grooves 9 of the ledge 7. In this respect, it is noted that the zones behind the webs 8 and grooves 9 of the ledge 7 are not wetted by a direct flow but only by eddies which are formed during a flushing operation.

The depths of the grooves 9, 9' is so adapted to the grain size of the filter mass 2 surrounding the drainpipe 3 that no grains can enter into the drainpipe 3. The filter mass or bed 2 can consist of a material of uniform grain size as well as of a relatively fine-grained material under certain circumstances (not shown) and of a coarser-grained supporting layer in which the drainpipe 3 is embedded.

Referring to FIGS. 5 and 6, a plurality of the drainpipes 3 are preferably so used in a filter basin 4 that a number of parallel drainpipes 3 cover the bottom 1 as close as possible. To this end, the drainpipes 3 are secured to the bottom 1 of the basin 4 with flanges or pipe clamps 11.

As shown in FIG. 5, each drainpipe 3 has an opening 14 in the bottom surface for removing filtrate during a filtering operation and for supplying the flushing media during a flushing operation. Each opening 14 is connected to a respective immersion tube which extends downwardly into a collecting main 13 which extends below the basin 4 along a symmetrical vertical plane 15. As indicated, each tube 12 extends through the bottom 1 of the basin 4. Also, the collecting main 13 extends across the width of the basin 4.

As indicated in FIG. 6, the openings 14 in the drainpipes 3 are staggered about the symmetrical vertical plane 15 with each opening 14 being offset from the midpoint of each drainpipe 3.

The connection of the immersion tubes 12 to the drainpipes 3 represents a disturbance to the desired undisturbed and even distribution of the flushing media. However, the effects of this disturbance are reduced by the fact that the tubes 12 do not open directly into the center or midpoint of the drainpipes 3 but are staggered relative thereto. By staggering the openings 14 about the center plane 15, the formation of a continuous strip along the collecting main 13 with a disturbed distribution of the flushing media on the bottom 1 of the filter basin 4 is avoided. The same result is achieved for the minor disturbances in the distribution of the flushing media by the pipe clamps by arranging the pipe clamps 11 by staggering the distances of the clamps from the ends of the drainpipes 3.

The drainpipe 3 may be made in a simple manner by deforming a strip of suitable material, for example of sheet metal or plastic, by bending the strip three times to a triangular shell so that the slot 6 is formed automatically between the ends of the strip which then face each other. The slot 6 is then closed by attaching a stepped ledge 7, 7' by spot welding or cementing.

The invention thus provides a drainpipe of relatively simple construction which can be easily fabricated and put in place within a reversible filter system for water treatment. In addition, by directing flushing media along the bottom 1 of the filter basin 4, dead zones can be eliminated. Also, the flushing media tends to follow the triangular shape of the drainpipes so that the zones above the pipe are also backwashed.

What is claimed is:

1. A structure for a reversible filter system for water treatment comprising:
    a filter basin having a bottom for receiving a filter bed thereon;
    a collecting main extending below said basin along a symmetrical vertical plane;
    a plurality of drainpipes mounted within said basin, on said bottom in perpendicular relation to said vertical plane, each said drainpipe being of triangular cross-section and having at least one elongated slot in a surface thereof facing said bottom and an opening in said surface offset from a mid-point of drainpipe;
    a plurality of immersion tubes, each said tube being connected with an opening in a respective drainpipe and extending into said collecting main; and
    a plurality of ledges on said bottom, each said ledge supporting a respective drainpipe thereon and having a plurality of upstanding webs and grooves disposed in alternating relation and in facing relation to said slot of a respective drainpipe.

2. A structure for a reversible filter system as set forth in claim 1 wherein each groove widens from a center line of said ledge towards each side of said ledge.

3. A structure for a reversible filter system as set forth in claim 2 wherein each groove has a base extending downwardly from said center line of said ledge towards each side of said ledge.

4. A structure for a reversible filter system as set forth in claim 1 wherein said webs are of rhombic shape.

5. A reversible filter system for water treatment comprising:
    a filter basin having a bottom;
    a filter bed of uniform grain size received on said filter basin bottom;

a collecting main extending below said basin along a symmetrical vertical plane;

a plurality of drainpipes mounted within said basin, on said bottom in perpendicular relation to said vertical plane, each said drainpipe being of triangular cross-section and having at least one elongated slot in a surface thereof facing said bottom and an opening in said surface offset from a midpoint of said drainpipe;

a plurality of immersion tubes, each said tube being connected with an opening in a respective drainpipe and extending into said collecting main; and a plurality of ledges on said bottom, each said ledge supporting a respective drainpipe thereon and having a plurality of upstanding webs and grooves disposed in alternating relation and in facing relation to said slot of a respective drainpipe.

* * * * *